(No Model.) 2 Sheets—Sheet 2.
C. B. DAVIS & E. H. RIDDELL.
WATER FILTER.
No. 404,962. Patented June 11, 1889.
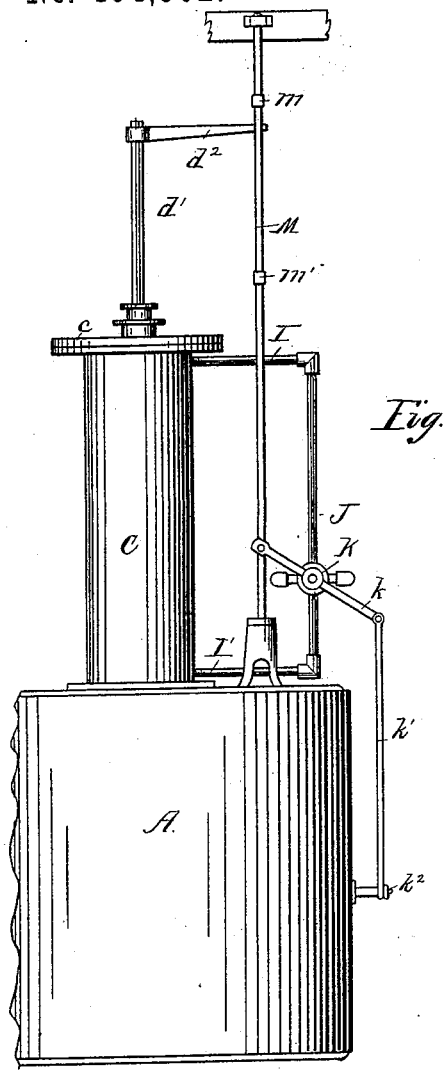
Fig. 5.
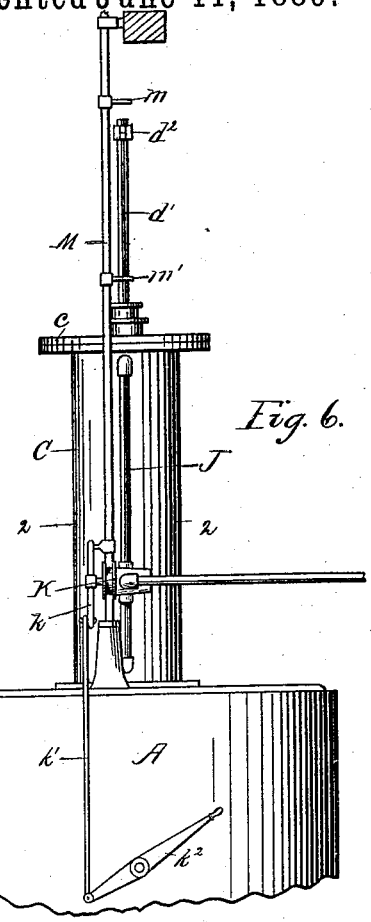
Fig. 6.
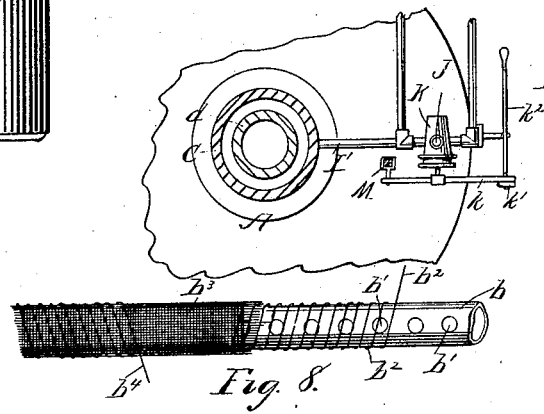
Fig. 7.
Fig. 8.
Witnesses.
B. M. Whitaker
Irvine Miller
Inventors.
Chester B. Davis.
Edward H. Riddell.
By Coburn Thacher
Attys.

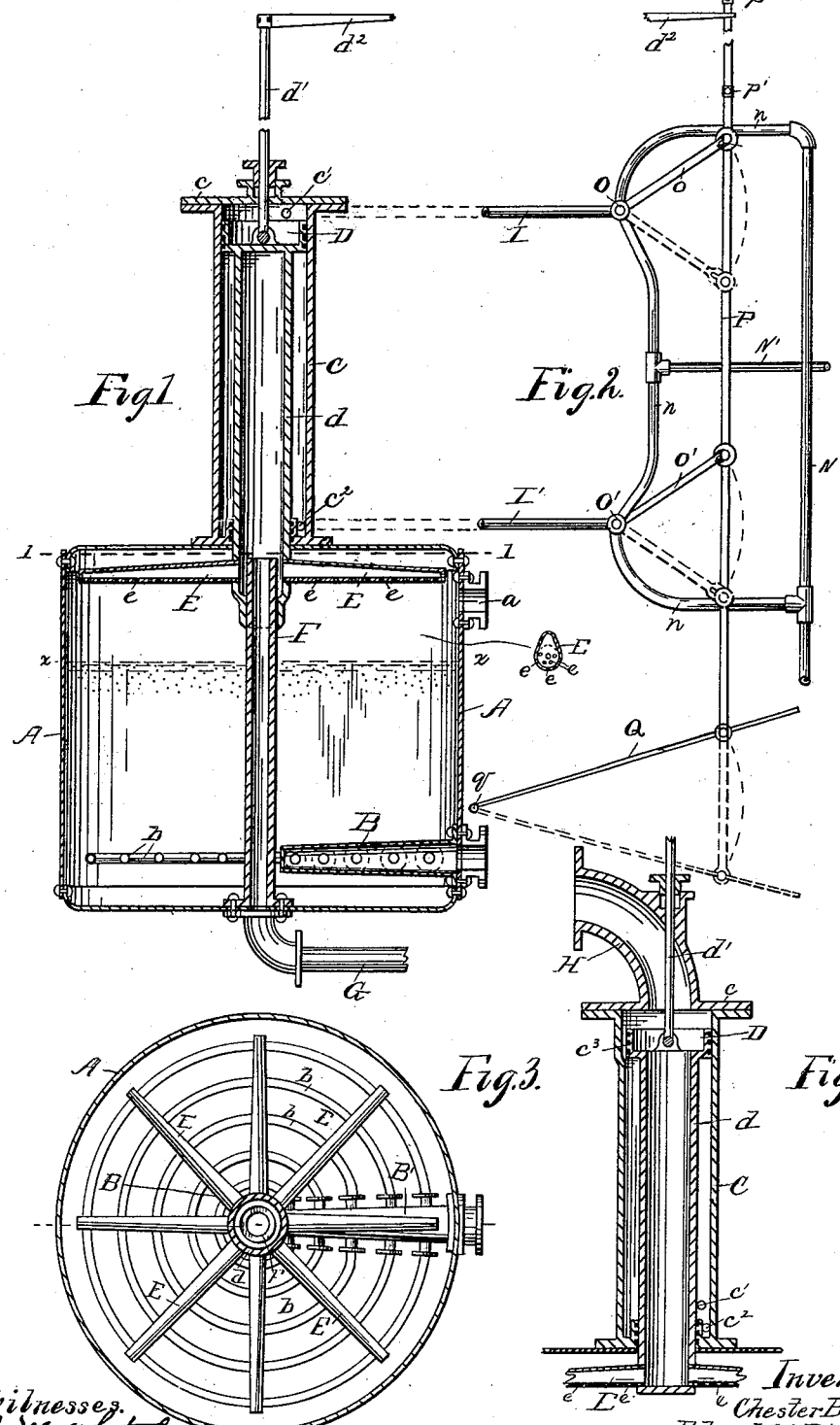

UNITED STATES PATENT OFFICE.

CHESTER B. DAVIS AND EDWARD H. RIDDELL, OF CHICAGO, ILLINOIS.

WATER-FILTER.

SPECIFICATION forming part of Letters Patent No. 404,962, dated June 11, 1889.

Application filed December 17, 1887. Serial No. 258,241. (No model.)

*To all whom it may concern:*

Be it known that we, CHESTER B. DAVIS and EDWARD H. RIDDELL, citizens of the United States, residing at Chicago, in the county of Cook and State of Illinois, have invented a certain new and useful Improvement in Water-Filters, which is fully set forth in the following specification, reference being had to the accompanying drawings, in which—

Figure 1 represents a vertical section of a filter embodying our invention; Fig. 2, a detail elevation of the lever mechanism for controlling the valves to govern the admission of water to the piston-cylinder; Fig. 3, a plan section of the filter with the tank empty, taken on the line 1 1 of Fig. 1; Fig. 4, a detail vertical section showing a modification in the construction of the cylinder and piston; Fig. 5, a side elevation showing the devices for controlling the movement of the piston; Fig. 6, a front elevation of the same; Fig. 7, a plan section taken on the line 2 2 of Fig. 6, and Fig. 8 a detail elevation showing the particular construction of the collector-pipes on an enlarged scale.

Our invention relates especially to filters designed for purifying large volumes of water.

The improvements are intended to provide means for thoroughly washing the filter without removing the sand or other filtering material, and to successfully collect the water at the bottom of the filter.

In filters of large size, where the filtering-bed must of course contain a large body of sand or other filtering material, it is very difficult to wash the filter successfully without removing the filter-bed. This has led to the use of mechanism in some instances for the removal of the sand, or, rather, changing it from one receptacle to another for the purpose of washing. While this method is successful in thoroughly washing the sand, it is obviously expensive and attended by considerable loss of time occasioned by the transfer of the filtering material from one receptacle to another, the washing of the sand, and its return to the filter-tank.

It is the purpose of our present invention to obviate these difficulties and thoroughly and satisfactorily wash the filtering material without removing it from the filter-tank.

We will proceed to describe in detail one way in which we have carried out our invention in practical form, and will then point out definitely in claims the improvements which we believe to be new and wish to protect by Letters Patent.

In the drawings, A represents the tank of a filter, which is of any suitable construction, and is filled up to the line $x\ x$ with sand, gravel, or other filtering material. At the bottom of the tank is a water-collector B, which may be of any ordinary construction. The one shown in the drawings is composed of a series of pipes $b$, perforated and arranged in circles one within the other and connected at each end to a large pipe B', arranged radially and extending outward through the wall of the tank to connect with the discharge-pipe, or connecting with the latter in any other way.

The pipes $b$ are provided with perforations $b'$, to permit the water to pass into them and thence to the large pipe through which the discharge is made. To guard against the admission of particles of sand or other substances, these pipes are surrounded by a kind of strainer through which the water must pass. We construct this covering by first winding a wire $b^2$ spirally around the pipes, then wrapping wire-cloth $b^3$ over this, and, lastly, winding another wire $b^4$ around the outside of the cloth spirally, and preferably in a contrary direction to that of the first wire $b^2$, as shown in Fig. 8 of the drawings. The wire-cloth is thus held slightly away from the surface of the pipe, which facilitates the collection of the water and its entrance into the collecting-pipes, while the outer wire securely fastens the covering in place upon the respective pipes.

A cylinder C is mounted upon the top of the tank, being fastened thereto. The upper end of the cylinder is closed by a suitable head $c$, but at the lower end there is an opening which corresponds to an opening in the top of the tank to provide communication with the interior of the latter. Ports $c'\ c^2$ are provided for the admission and exhaust of water, as will be hereinafter described. In Fig. 1 these ports are arranged, respectively, at the upper and lower ends of the cylinder, but in Fig. 4 both are located at the lower end of the cylinder. A piston D is fitted within the cylinder, being packed in any suitable way to make it fit water-tight. This piston is provided with a long hollow stem $d$, which extends down through the lower end of the cylinder and the top of the tank into the upper portion of the latter, passing through a box at the bottom of the cylinder, which is packed to make it water-tight. At the lower end of this stem and inside of the filter-tank there is a series of radial arms E, which are hollow, closed at their outer ends, and opening into the hollow stem of the piston at their inner ends, being suitably attached to this stem. These arms taper slightly as they extend outward, and are provided with perforations $e$, arranged mostly on the under side and ends, the purpose of which will be presently described.

The water-inlet pipe discharges into the hollow stem of the piston, and the inlet may be made either at the upper or lower end of the cylinder. We have shown constructions for both modes of delivery. In Fig. 1 of the drawings a construction is shown for delivering water into the lower end of the hollow stem. In this case the lower end of the stem is open and receives the upper end of an inlet-pipe F, passing up into the stem, which is telescoped upon it. The pipe F extends down to the bottom of the tank, where it connects with the water-supply pipe G on the outside of the tank, an opening being made in the bottom of the latter for this purpose. In Fig. 4 of the drawings a modification is shown for the purpose of introducing water at the top of the cylinder. In this case the lower end of the piston-stem is closed, while the upper end is open. An opening is also made in the cylinder-head, which is provided with a pipe or union H, by means of which connection is made with the water-supply pipe. In this modification both ports $c'$ $c^2$ are arranged near the lower end of the cylinder, and a small passage $c^3$ is provided at the upper end of the cylinder, whereby a by-pass is made to the upper side of the piston when the latter is raised to the upper end of the cylinder. It is obvious that in each construction water, being delivered into the interior of the stem by a pump or any other pressure device, will be forced outward through the radial pipes E. These pipes, being arranged as described and provided with perforations opening downward, serve to distribute the water which is discharged through them into the filter-tank over the entire area of the latter. This, however, is a secondary purpose, their main function being exercised in the process of washing the filter, which we will now describe.

The cylinder is connected suitably with the water-supply and an auxiliary pump, or some other suitable device, whereby water may be forced into it through one of the ports and exhausted from the other. In Figs. 1 and 2 a pipe I is connected with the port $c'$, and a similar pipe I' with the port $c^2$, both being connected with the auxiliary pump and a valve mechanism, which will be described presently. Now, if the pipe I be open to pressure and the pipe I' to exhaust, water will be forced into the upper end of the cylinder above the piston, and the latter will be forced downward, carrying the radial delivery-arms down into the tank. This movement is effected whenever it is desired to wash the filter. The water-supply is delivered into the tank under pressure through the radial pipes with considerable force, and these pipes being forced down steadily into the tank, the sand or other filtering matter will be stirred up by the force of the water-jets and a thorough mixing of the sand and water effected. During this operation the outlet from the filter is not through the ordinary discharge-pipe, but through another opening $a$ near the top of the tank, through which the dirty water is allowed to escape until the washing is completed. The discharge through the ordinary outlet must of course be stopped by a suitable valve during this operation of washing. During the operation a small amount of sand may be carried away with the wash-water, but not in sufficient quantity to be of much importance, and the waste is easily supplied by the introduction of fresh sand into the tank. The stem of the piston, being telescoped on the inlet-pipe, will of course slide downward upon the latter as far as it is necessary to force it. We have found that with these devices properly constructed the delivery-arms may be gradually forced downward almost to the bottom of the tank, the sand in the meantime being thrown into agitation and mixed with the water. Ordinarily, however, it is not necessary to carry the operation to the bottom of the tank, for the great bulk of matter collected by the filter will be found in the upper portion of the sand body, and may be thoroughly washed out without disturbing the lower portion of the filtering mass. When the washing is completed, the valve mechanism is changed, so that the exhaust is through the port $c'$, while the port $c^2$ is open to pressure. The piston will then be lifted to the upper end of the cylinder, thus restoring the apparatus to position for normal work, which is resumed upon closing the discharge-opening for wash-water and opening the regular discharge. A certain amount of pressure must be maintained underneath the piston in order to hold the delivery-arms up in proper position; or the piston may be suspended from the outside by means of any suitable device connected to a rod $d'$, passing through a stuffing-box in the cylinder-head and connected to the piston.

The mechanism for controlling water-pressure in the cylinder may be of any construction suitable for the purpose. We will describe that shown in the drawings. In Figs.

5, 6, and 7 the mechanism shown is adapted for use with a four-way cock. The pipes I and I' are connected to an upright pipe J, in which is seated a four-way cock K, the pipe being joined to the shell of the cock both above and below. A pressure-pipe L and an exhaust-pipe L' are also connected to and inserted in this shell on opposite sides thereof. The former must of course connect directly with the auxiliary pump, while the latter has a free discharge for usual exhaust purposes. A lever-arm $k$ is attached to the cock, one end of which is connected by a rod $k'$ to a hand-lever $k^2$, by the movement of which the cock may be adjusted to connect the pressure and exhaust pipes with the ports $c'$ $c^2$, respectively, or to reverse the connection for operation, as described. A vertical sliding rod M is mounted in suitable keepers and connected to an extension of the lever-arm $k$. Stops $m$ $m'$ are located on this rod at suitable distances, and an indicator-arm $d^2$ is fastened to the upper end of the rod $d'$, being extended outward so as to stand between the two stops. Now it is evident that as the indicator-arm moves up and down with the movement of the piston in the cylinder it will be brought on its upward movement in contact with the stop $m$ and on its downward movement with the stop $m'$. This contact with the stops will reciprocate the rod M, thereby turning the cock K, so as to shut off and reverse the connection between the cylinder and the pressure and exhaust pipes. The stops are located at such points on the rod M as to cut off pressure before the full stroke of the piston is completed, thereby preventing shock to the delivery apparatus in the tank. The pressure upon the piston in the operation of washing the filter may, however, be regulated by the hand-lever and increased or diminished as occasion requires; or in some instances the operation may be made automatic by the proper adjustment of the stops above described.

In Fig. 2 of the drawings a different valve mechanism is shown. Here a pipe N is connected with the auxiliary pump, and is the pressure-pipe. It is provided with a supplementary pipe $n$ of yoke form, connected at its ends to the main pipe, but at points some little distance apart. The pipes I and I' are connected to this yoke at different points, and at a point between the two places of union the exhaust-pipe N' is joined to the yoke.

Three-way cocks O O' are seated, respectively, at the points of juncture between the pipes I I' and the branch $n$. These cocks are provided, respectively, with link-arms $o$ $o'$, which are connected to a sliding rod P, which corresponds to the sliding rod M. The reciprocation of this rod adjusts the three-way cocks so as to give pressure through the pipe I and exhaust through I', or the reverse. The rod P is reciprocated by a lever Q, to which it is connected at its lower end, and which is pivoted to any suitable support at $q$. The rod P is also provided with stops $p$ $p'$, between which the arm $d^2$ reciprocates and operates, as already described with the rod M.

If the delivery of water to the filter is at the upper end of the cylinder, as shown in Fig. 4 of the drawings, the pressure for operating the piston is applied below the latter, both ports being at the lower end of the cylinder. In this construction the relative arrangement of the ports in the valves and the pressure and exhaust pipes is such that when the way is open for pressure to the cylinder the exhaust will be closed, and when the exhaust is open pressure will be shut off. The force of the water from the general inlet-pipe at the upper end of the cylinder acts constantly to drive the piston down, and when it is desired to wash the filter or depress the piston and delivery-pipes connected to it it is only necessary to turn the valves so as to cut off pressure below the piston and open the exhaust, when the force of the water coming in from the general inlet above the piston will be sufficient to carry the delivering apparatus down into the tank, as already described. When it is desired to raise the piston, the valves are reversed, so as to cut off exhaust and open pressure, when, the force applied below the piston, being greater than that above, it will be forced up toward the upper end of the cylinder. When the piston arrives at the upper end of the cylinder, the by-pass permits water from below the piston to pass into the upper part of the cylinder above the piston, and so pressure upon the latter is equalized. The valve mechanism is also constructed and arranged so that between the two adjustments, whereby pressure and exhaust ports are opened and closed, respectively, both ports may be closed, thereby shutting off both pressure and exhaust from the cylinder. This being done, after the piston is lifted to the upper end of the cylinder, it will be held in this position by the water in the cylinder below it.

We have described the operation of this mechanism for washing the filtering material. The adjustability of the delivery apparatus is also advantageous in the process of filtering. As already stated, the substances held in the water are caught in the upper portion of the filter-bed, and usually not more than from a fourth to a third of the latter is actually occupied by the material caught from the water when washing will be required, and so this latter operation will necessarily be of frequent occurrence. With our improvement the filtering action can be kept up until the entire filter-bed has been used. This is accomplished by setting the delivering device down into the filter-bed a suitable distance, when the latter has become foul, and then arresting its further movement downward at the desired point and retaining it in this new position for a further period of filtering action. The depression of the delivery should be through so much of the bed as has become foul. Then the filtering action will be carried on for a time by a portion of the bed immediately below, until another section has become filled with dirt, when the delivery-pipes may be still further depressed, and so on until the bottom of the bed is reached. In order to accomplish this adjustment of the delivering device to different positions in the tank, the valve mechanism that is employed must be constructed as already suggested, so that by moving its adjusting-lever to a point between the two extremes or reversing-points the ports of the valves will be closed to both pressure and exhaust connections, so that both pressure and exhaust will be cut off from the cylinder. Now, when it is desired to set the delivery-pipes in a new position, the lever is moved so as to open pressure and exhaust connections with the cylinder properly to depress the piston, as already described. The effect will be the same as in the washing operation, and the pipes will be carried down into the filter-bed, as already described. When the desired point is reached, the valve-lever is moved so as to shut off pressure and exhaust connection, and of course the movement of the piston will be arrested, and it will be held at the point where stopped, thereby holding the delivery-arms in their new position.

In the washing operation it may be desirable sometimes to move the delivering device up and down through the filtering material several times. With the sliding rod M or P, provided with stops, as described, and the arm $d^2$ connected to the piston, this action may be produced automatically. At each end of the stroke the valves will be reversed automatically, when, of course, a reverse movement of the piston will be produced.

We have described above one practical way of carrying out our invention. It is obvious, however, that the hydraulic mechanism is not the only one which may be used for lowering and raising the delivering device. Compressed air may be used for reciprocating the piston in the cylinder; or if the latter is disconnected from the water-inlet to the filter steam may be employed. Cylinders and pistons may also be entirely dispensed with and the delivering device moved vertically in the tank by other mechanism, which may be operated by power, or even by hand. In some instances a simple mechanism operated by a hand-lever may be preferable to anything else for lowering and raising the delivering device in the tank. The main feature of our invention is the vertical movement and adjustment of the delivering device within the tank, and we believe this feature is entirely new. We therefore wish to be understood as claiming a movable delivery, broadly, without limitation to any particular mechanism for effecting the movement.

It is also obvious that in details of construction there may be many variations in different parts of the mechanism. The construction of the delivering device may be modified, the valve mechanism changed, and many other modifications which a good mechanical knowledge will suggest. We do not wish to be understood, therefore, as limiting ourselves to the particular devices herein shown and described, but wish to be understood as contemplating in our invention such mechanical changes as may be effected without modifying the controlling features of our invention.

Having thus described our invention, what we claim as new, and desire to secure by Letters Patent, is—

1. In a water-filter, the filter-tank, in combination with a series of vertically-movable delivery-pipes arranged within the tank and perforated, as described, and actuating devices whereby said pipes may be moved up and down through the filter-bed within the tank to wash the filter-bed without removing it from the tank, substantially as and for the purposes specified.

2. In a water-filter, the tank, in combination with the radial perforated arms, the hydraulic cylinder, the piston within said cylinder, the inlet-pipe, and the hollow piston-stem to which said arms are connected, substantially as and for the purposes specified.

3. The filter-tank A, in combination with the hydraulic cylinder C, provided with ports $c'$ $c^2$, the inlet-pipe, the piston D, provided with hollow stem $d$, the perforated pipes E at the lower end of the stem, the pipes I I', and a valve mechanism for directing and controlling the hydraulic pressure and exhaust through said pipes to the cylinder, substantially as and for the purposes specified.

4. In a water-filtering apparatus, the filter-tank provided with a bed of suitable filtering material, in combination with the hydraulic cylinder mounted on the filtering-tank and provided with ports $c'$ $c^2$, the piston D, with its hollow stem $d$ extending into the filter-tank, the radial perforated arms attached to the end of the hollow stem within the tank, an inlet-pipe arranged to deliver water to the hollow stem and radial arms attached thereto, the pressure and exhaust pipes I I', the pipe J, the pressure and exhaust pipes L L', the four-way cock K, and the lever $k^2$, connected to said cock, substantially as and for the purposes specified.

5. In a water-filtering apparatus, the filter-tank provided with a bed of suitable filtering material, in combination with the hydraulic cylinder mounted on the filtering-tank and provided with ports $c'$ $c^2$, the piston D, with its hollow stem $d$ extending into the filter-tank, the radial perforated arms attached to the end of the hollow stem within the tank, an inlet-pipe arranged to deliver water to the hollow stem and radial arms attached thereto, the pressure and exhaust pipes I I', the sliding rod provided with stops and connected to the controlling-valves, the rod $d'$, attached to the piston and projecting out through the head of the cylinder, and the arm $d^2$, attached to the said rod, substantially as and for the purposes specified.

6. In a water-filtering apparatus, the filter-tank provided with a bed of suitable filtering material, in combination with a series of vertically-movable delivery-pipes arranged within the tank and perforated, as described, actuating devices whereby said pipes may be moved up and down through the filter-bed within the tank, an inlet-pipe arranged to deliver water to the said movable pipes, and shifting devices operated by the movement of the movable pipes, whereby the latter may be moved up and down repeatedly and automatically through the filter-bed to wash the latter without removing it from the tank, substantially as and for the purposes specified.

7. In a water-filter, the perforated collecting-pipes $b$, in combination with the wire $b^2$, wound coarsely upon the pipes, the wire-netting $b^3$, wrapped upon the outside of the wire $b^2$, and the wire $b^4$, wound upon the outside of the said netting, substantially as and for the purposes specified.

8. The filter-tank, in combination with the hydraulic cylinder, the piston in said cylinder, the hollow piston-stem, the perforated pipes at the lower end of the stem, and an inlet-pipe arranged to deliver water into the hollow stem, substantially as and for the purposes specified.

CHESTER B. DAVIS.
EDWARD H. RIDDELL.

Witnesses:
CARRIE FEIGEL,
A. M. BEST.